Dec. 15, 1970  HISASHI YONEZU  3,548,372
FLASHER DEVICE OF SEQUENTIAL LIGHTING TYPE FOR
AUTOMOTIVE VEHICLES
Filed Sept. 3, 1968  2 Sheets-Sheet 1

Inventor
Hisashi Yonezu
By Cushman, Darby & Cushman
Attorneys

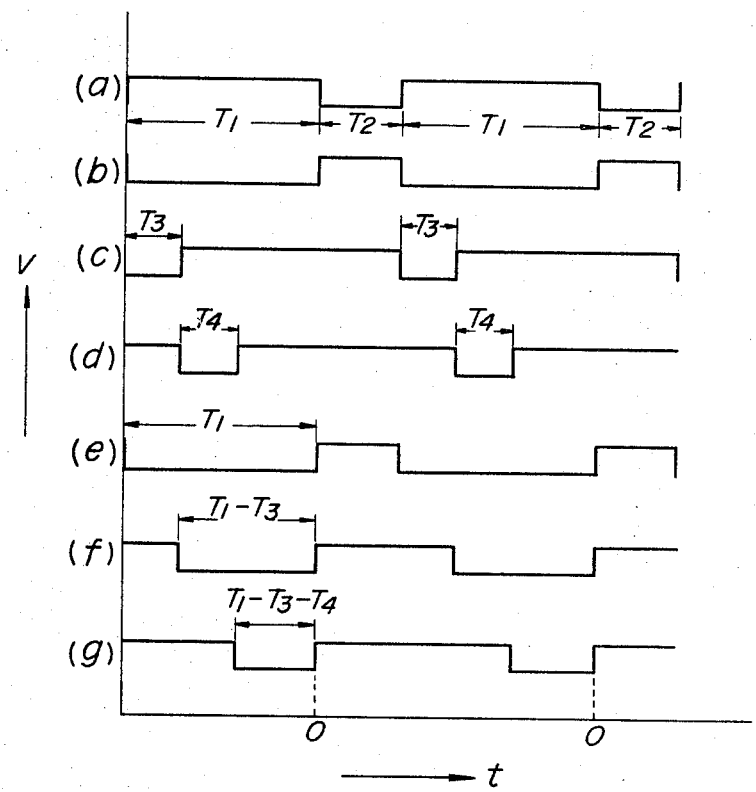

3,548,372
FLASHER DEVICE OF SEQUENTIAL LIGHTING TYPE FOR AUTOMOTIVE VEHICLES
Hisashi Yonezu, Aichi-ken, Japan, assignor to Nippon Denso Company Limited, Kariya-shi, Japan, a corporation of Japan
Filed Sept. 3, 1968, Ser. No. 756,835
Claims priority, application Japan, Jan. 24, 1968, 43/4,573
Int. Cl. B60q 1/38
U.S. Cl. 340—82                2 Claims

ABSTRACT OF THE DISCLOSURE

A flasher device of the sequential type for automotive vehicles having an astable multivibrator, a plurality of one-shot multivibrators disposed in series with each other in the sequence stage of the astable multivibrator in a number depending on the number of turn signal lamps, and an AND circuit for supplying the outputs from the astable multivibrator and the one-shot multivibrators to the turn signal lamps thereby sequentially energizing the turn signal lamps.

BACKGROUND OF THE INVENTION

Field of the invention

This invention relates to flasher devices of the sequential type for automotive vehicles and more particularly to a flasher device of the kind described which is preferably used as a turn signal flasher.

Description of the prior art

Automotive vehicles are equipped with a turn signal flasher which includes a turn signal disposed on the left-hand and right-hand sides at the front and rear of the vehicle body. Conventional practice for turn signals has been such that those turn signals on one side at the front and rear of the vehicle body are caused to flash when that side marks the advancing direction of the vehicle.

However, the recent increase in the number of automotive vehicles as a result of the wide spread of vehicles among people and the trend toward a higher running speed of the vehicles have made it necessary to design the turn signal lamps so that they are more clearly identifiable at a distance, resulting in a larger size and in an increase in the number of lamps used in the turn signal lamps. Among many turn signal flashers proposed so far, the sequential flasher in which a plurality of turn signal lamps are successively energized is found most advantageous for a clearer indication of the advancing direction. One form of such a turn signal flasher comprises three turn signal lamps disposed on either side at the rear of the vehicle body. When the vehicle turns to the left, for example, the left-hand, rear turn signal lamp which is nearest to the center of the vehicle body is first energized, the second turn signal lamp is then energized, the third turn signal lamp is finally energized, and then all the lights are simultaneously deenergized, the above operation being repeated to indicate the advancing direction of the vehicle. According to this manner of turn signal, the turn signal lamps are sequentially energized in a sequential order toward the turning direction which is left in this case and then all the lights are simultaneously deenergized. By the repetition of the above operation, vehicles following this particular vehicle can very clearly identify the turning direction of the preceding vehicle.

However, flasher devices known in the prior art, which are adapted to effect the sequential energization of turn signal lamps in the manner described above, employ an arrangement in which the rotation of a motor is transmitted through a reduction gearing to a cam to rotate the latter so that the cam interrupts sequentially a plurality of pairs of contacts, or an arrangement in which a plurality of flashing relays employing a heating filament are provided so as to sequentially interrupt a plurality of pairs of contacts. Any one of these prior flasher devices is defective through a lack of durability because it includes many contacts and through bulkiness of size.

SUMMARY OF THE INVENTION

It is therefore a primary object of the present invention to provide a flasher device of the sequential type for automotive vehicles comprising a plurality of turn signal lamps, an astable multivibrator, a plurality of one-shot multivibrators disposed in series with each other in the sequence stage of said astable multivibrator in a number depending on the number of turn signal flashers, and an AND circuit for supplying the outputs from said astable multivibrator and said one-shot multivibrators to the turn signal lamps, said astable multivibrator being operative to determine the time of energization of the first turn signal lamp and the time of simultaneous deenergization of all the turn signal lamps, said one-shot multivibrators being operative to determine the sequential delays in the time of energization of the sequential lights except the first turn signal lamp, that is, the second, third and other turn signal lamps.

In accordance with the present invention, a durable flasher device of the sequential type can be obtained which can sequentially energize a plurality of turn signal lamps without in any way resorting to the use of a mechanism for interrupting many contacts. Furthermore, with the present invention a compact flasher device of a small size can be obtained.

BRIEF DESCRIPTION OF THE DRAWINGS

FIG. 2 is a graphic illustration of waveforms to illustrate the operation of the flasher device according to the present invention.

DESCRIPTION OF THE PREFERRED EMBODIMENT

Figure 1:
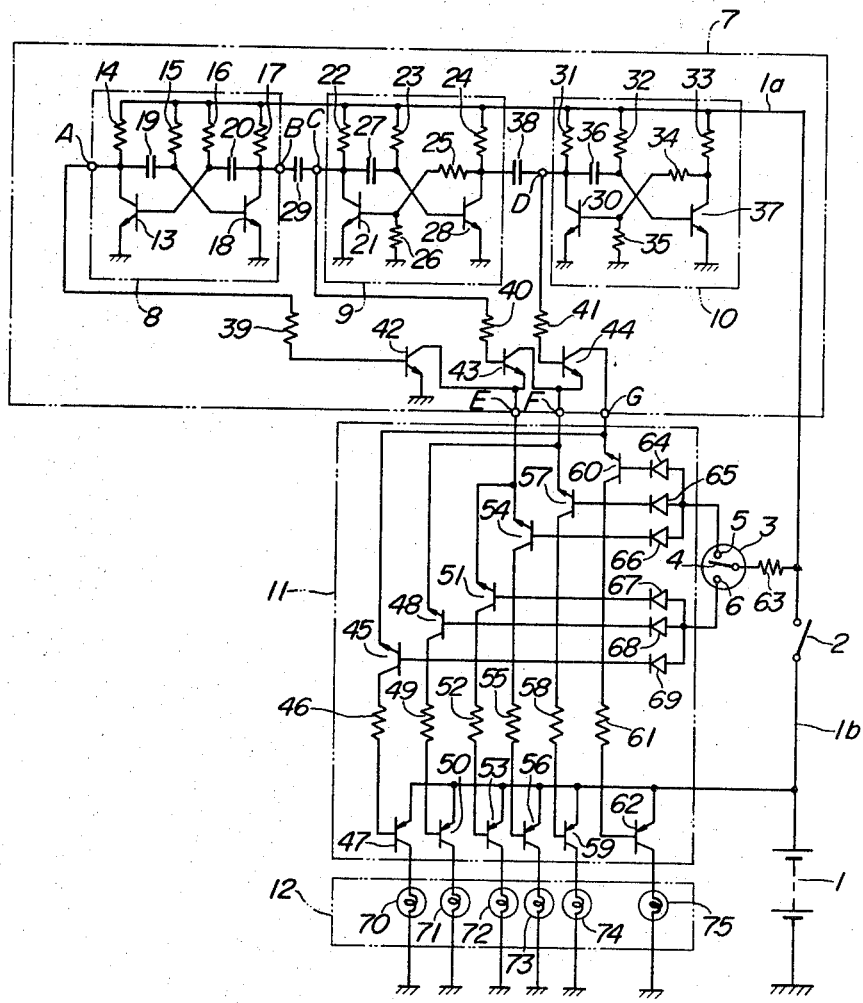
FIG. 1 is an electrical connection diagram of an embodiment of the flasher device according to the present invention.

Referring to FIG. 1, a power supply 1 is connected through an on-off switch 2 to a movable contact 4 of a turn signal switch 3. The movable contact 4 is connectable with a stationary contact 5 when the vehicle turns to the right and with a stationary contact 6 when the vehicle turns to the left. The flasher device of the sequential type according to the present invention is generally designated by the reference numeral 7 and comprises an astable multivibrator 8 which determines the flashing cycle of the flasher 7, and a plurality of one-shot multivibrators 9 and 10.

The astable multivibrator 8 comprises a transistor 13 whose collector is connected at a point A to one terminal of a resistor 14 which is connected at the other terminal to a power supply lead 1a. A capacitor 19 is connected to the connection point A of the collector of the transistor 13 and the resistor 14. The emitter of the transistor 13 is grounded, and the base of the transistor 13 is connected to a connection point of a resistor 16 and a capacitor 20. The other terminal of the capacitor 20 is connected to a connection point B of the collector of a transistor 18 and a resistor 17. The base of the transistor 18 is connected to a connection point of a resistor 15 and the other terminal of the capacitor 19, and the emitter of the transistor 18 is grounded. The resistors 14, 15, 16 and 17 are connected at the other terminal thereof to the power supply lead 1a.

The one-shot multivibrator 9 comprises a transistor 21 whose collector is connected to a connection point C of a resistor 22 and a capacitor 27. The base of the transistor 21 is connected to a connection point of resistors 25 and 26. The multivibrator 9 further comprises a transistor 28 whose collector is connected to a connection point of a resistor 24 and the other terminal of the resistor 25. The base of the transistor 28 is connected to a connection point of the other terminal of the capacitor 27 and a resistor 23. The resistors 22, 23 and 24 are connected at the other terminal thereof to the lead 1a, while the other terminal of the resistor 26 and the emitters of the transistors 21 and 28 are grounded.

The one-shot multivibrator 10 is designed to have entirely the same circuitry and circuit contacts as those of the one-shot multivibrator 9 described above. The one-shot multivibrator 10 comprises a transistor 30 whose collector is connected to a conection point D of a resistor 31 and a capacitor 36. The base of the transistor 30 is connected to a connection point of resistors 34 and 35, and the resistor 34 is connected at the other terminal thereof to a resistor 33 and to the collector of a transistor 37. The base of the transistor 37 is connected to a resistor 32 and to the other terminal of the capacitor 36. The resistors 31, 32 and 33 are connected at the other terminal thereof to the power supply lead 1a. The other terminal of the resistor 35 and the emitters of the transistors 30 and 37 are grounded.

The common connection point A of the collector of the transistor 13, the resistor 14 and the capacitor 19 in the astable multivibrator 8 is connected to the base of a transistor 42 through a resistor 39. The common connection point B of the collector of the transistor 18, the resistor 17 and the capacitor 20 in the astable multivibrator 8 is connected through a capacitor 29 to the common connection point C of the collector of the transistor 21, the resistor 22 and the capacitor 27 in the one-shot multivibrator 9. The common connection point C is further connected to the base of a transistor 43 through a resistor 40. The common connection point of the collector of the transistor 28, the resistor 24 and the resistor 25 in the one-shot multivibrator 9 is connected through a capacitor 38 to the common connection point D of the collector of the transistor 30, the resistor 31 and the capacitor 36 in the one-shot multivibrator 10. The common connection point D is further connected to the base of a transistor 44 through a resistor 41. The transistor 42 has its emitter grounded and its collector connected to the emitter of the transistor 43 at a point E. The transistor 43 has its collector connected to the emitter of the transistor 44 at a point F. The collector of the transistor 44 is connected to a point G. Thus, the resistors 39, 40 and 41, and the transistors 42, 43 and 44 constitute an AND circuit for operating the outputs from the astable multivibrator 8 and the one-shot multivibrators 9 and 10.

The movable contact 4 of the turn signal switch 3 is connected to the power supply lead 1a through a resistor 63, while the stationary contact 5, which is connectable with the movable contact 4 when the vehicle turns to the right, is connected to the bases of transistors 54, 57 and 60 through respective diodes 66, 65 and 64. The emitter of the transistor 54 is connected to the point E, the emitter of the transistor 57 to the point F, and the emitter of the transistor 60 to the point G. The collector of the transistor 54 is connected to the base of a transistor 56 through a resistor 55, and the collector of the transistor 56 is grounded through a turn signal lamp 73. The collector of the transistor 57 is connected to the base of a transistor 59 through a resistor 58, and the collector of the transistor 59 is grounded through a turn signal lamp 74. The collector of the transistor 60 is connected to the base of a transistor 62 through a resistor 61, and the collector of the transistor 62 is grounded through a turn signal lamp 75.

The stationary contact 6 of the turn signal switch 3, which is connectable with the movable contact 4 when the vehicle turns to the left, is connected to the bases of transistors 45, 48 and 51 through respective diodes 69, 68 and 67. The emitter of the transistor 45 is connected to the point G, the emitter of the transistor 48 to the point F, and the emitter of the transistor 51 to the point E. The collector of the transistor 45 is connected to the base of a transistor 47 through a resistor 46, and the collector of the transistor 47 is grounded through a turn signal lamp 70. The collector of the transistor 48 is connected to the base of a transistor 50 through a resistor 49, and the collector of the transistor 50 is grounded through a turn signal lamp 71. The collector of the transistor 51 is connected to the base of a transistor 53 through a resistor 52, and the collector of the transistor 53 is grounded through a turn signal lamp 72. The emitters of the transistors 47, 50, 53, 56, 59 and 62 are connected to a power supply lead 1b which is directly connected to the power supply 1.

The operation of the device according to this invention will now be described with reference to FIG. 2. The astable multivibrator 8 is energized in response to closure of the on-off switch 2. The astable multivibrator 8 is so designed that the time constant of the circuit comprising the capacitor 19 and the resistor 15 differs from the time constant of the circuit comprising the capacitor 20 and the resistor 16 in order that the conducting period of the transistor 13 differs from that of the transistor 18. Suppose now that the transistor 13 is in its cutoff state and the transistor 18 is in its conducting state. Then, the potential at the point A is substantially equal to the power supply volage V and the potential at the point B is substantially zero. This state continues for a time $T_1$ and is then inverted so that now the potential at the point A is subsanially zero and the potential at the point B is substantially equal to the power supply voltage V. The above state continues for a time $T_2$ and is then inverted again. FIG. 2a shows the collector voltage waveform of the transistor 13 and FIG. 2b shows the collector voltage waveform of the transistor 18. In FIG. 2, the vertical axis represents the voltage V and the horizontal axis represents the time $t$.

As is commonly known, the transistor 28 in the one-shot multivibrator 9 is continuously held in its conducting state by the base current flowing into the base thereof through the resistor 23 in the state in which no signal is applied to the multivibrator 9. Therefore, the base of the transistor 21 is at zero potential, and the power supply voltage V is applied to the point C with which the collector of the transistor 21 is connected. When now the potential at the point B varies from the power supply voltage V to zero, the point C is grounded for a short time by way of a path which is traced from the power supply 1–power supply lead 1a–resistor 22, point C–capacitor 29–point B–transistor 18 to the ground because of the fact that the point B is connected to the point C through the capacitor 29. As a result, a charging current flows into the capacitor 27 from the power supply 1 by way of a path which is traced from the power supply 1–power supply lead 1a–resistor 23–capacitor 27 to the point C, and the potential at the common connection point of the resistor 23, the capacitor 27 and the base of the transistor 28 becomes zero to drive the transistor 28 to its cutoff state. This state continues for a time $T_3$, as shown in FIG. 2c, which is determined by the time constant of the circuit comprising the resistor 23 and the capacitor 27. During the time $T_3$, the transistor 21 is continuously held in its conducting state. After the time $T_3$, the transistor 28 is again placed in its conducting state so that the potential at the collector of the transistor 28 becomes zero. Because of the fact that the collector of the transistor 28 is connected to the point D of the one-shot multivibrator 10 through the capacitor 38, the point D is connected to the ground through the capacitor 38 and the transistor 28 for a time $T_4$ as shown in FIG. 2d. The time $T_4$, during which the point D is kept at zero potential, is determined by the time constant of the circuit comprising the resistor 32 and the capacitor 36.

It will be recalled that the point A is connected to the base of the transistor 42 through the resistor 39, and the point A is at the power supply voltage V for the time $T_1$. Therefore, a positive potential is applied to the base of the transistor 42 for the time $T_1$ so that the condition for driving the transistor 42 to its conducting state is thereby set up and the potential at the point E connected to the collector of the transistor 42 becomes substantially zero as shown in FIG. 2c. In contrast, the point A is kept at zero potential for the time $T_2$ and hence the base of the transistor 42 is at zero potential. Since the point C is connected to the base of the transistor 43 through the resistor 40 and is kept at zero potential for the time $T_3$, the base of the transistor 43 is kept at zero potential for this time $T_3$ so that the transistor 43 is in its cutoff state and will be driven to its conducting state after the time $T_3$. However, since the emitter of the transistor 43 is connected to the point E, the collector of the transistor 42, hence the point F is at substantially zero potential for a time $T_1-T_3$ as shown in FIG. 2f. The point D is connected to the base of the transistor 44 through the resistor 41 and is kept at zero potential for the time $T_4$. Accordingly, the base of the transistor 44 is kept at zero potential for the time $T_4$ so that the transistor 44 is in its cutoff state and will be driven to its conducting state after the time $T_4$. However, since the emitter of the transistor 44 is connected to the point F, the collector of the transistor 43, hence the point G is at substantially zero potential for a time $T_1-T_3-T_4$ as shown in FIG. 2g.

When the movable contact 4 of the turn signal switch 3 is brought into contact with the stationary contact 5 for right turn signal a positive potential is applied to the base of the transistors 54, 57 and 60 through the respective diodes 66, 65 and 64 so that the transistors 54, 57 and 60 are ready to be driven to their conducting state. Because of the fact that the points E, F and G are connected to the emitters of the respective transistors 54, 57 and 60, the point E takes its substantially zero potential level for the time $T_1$ to drive the transistor 54 to its conducting state for this particular time. As a result, zero potential appears at the base of the transistor 56 through the resistor 55 to drive the transistor 56 to its conducting state, thereby energizing the turn signal lamp 73. The turn signal lamp 73 is deenergized after the time $T_1$ and is energized again after the time $T_2$. The energization and deenergization of the turn signal lamp 73 is repeated until the movable contact 4 of the turn signal switch 3 returns to its neutral position. Further, the point F takes its substantially zero potential level for the time $T_1-T_3$, during which time the transistor 57 conducts. Therefore, a zero potential appears at the base of the transistor 59 through the resistor 58 to drive the transistor 59 to its conducting state, thereby energizing the turn signal lamp 74. The turn signal lamp 74 is deenergized after the time $T_1-T_3$ and is energized again after a time $T_2+T_3$. Furthermore, the point G takes its substantially zero potential level for the time $T_1-T_3-T_4$, during which time the transistor 60 conducts. Therefore, a zero potential appears at the base of the transistor 62 through the resistor 61 to drive the transistor 62 to its conducting state, thereby energizing the turn signal lamp 75. The turn signal lamp 75 is deenergized after the time $T_1-T_3-T_4$ and is energized again after a time $T_2+T_3+T_4$. It will be seen that these three turn signal lamps 73, 74 and 75 are simultaneously deenergized as shown by a point O in FIG. 2, and the lighting time of the turn signal lamp 73 is longest while that of the turn signal lamp 75 is shortest.

An operation entirely similar to the above is performed to repeatedly energize and deenergize the turn signal lamps 72, 71 and 70 when the movable contact 4 of the turn signal switch 3 is brought into contact with the stationary contact 6 for left turn signal.

In mounting the turn signal lamps on the vehicle body, the turn signal lamp 73 which is the first right-hand lamp is mounted on the right-hand side of the rear of the vehicle body at a position nearest to the center of the vehicle, and then the turn signal lamps 74 and 75 which are the second and third lights are mounted on the right-hand side in the above order. Similarly, the turn signal lamp 72 which is the first left-hand light is mounted on the left-hand side of the rear of the vehicle body at a position nearest to the center of the vehicle, and then the turn signal lamps 71 and 70 which are the second and third lights are mounted on the left-hand side in the above order.

Although the above embodiment has referred to the case in which three turn signal lamps are provided on each side, it will be understood that turn signal lamps in any suitable number may be provided so that they can successively be energized according to the present invention.

What is claimed is:

1. A turn signal control device for sequentially lighting a plurality of turn signal lamps for use with a motor vehicle having an electrical power supply comprising:

an astable multivibrator having at least a single output for alternately producing a first and second electrical signal at said output, a plurality of monostable multivibrators each having an input and an output and each producing a given signal at that output for a predetermined length of time when a certain signal is applied to said input, one of said monostable multivibrators having its input connected to the output of said astable multivibrator so that that monostable multivibrator produces said given signal a its output when said first signal is produced and the remainder of said monostable multivibrators each having its input connected to the output of another of said plurality of monostable multivibrators so that said monostable multivibrators are connected in series and so that each of said remainder of monostable multivibrators produces said given signal for said predetermined length of time whenever the output of the monostable multivibrator to which it is connected ceases producing said given signal, and means connected to said astable multivibrator and to each of said monostable multivibrators for connecting one of said lamps to said supply whenever said first signal is produced and connecting a different one of the remainder of said lamps to said supply whenever one of said monostable multivibrators ceases producing said given signal and for keeping those lamps so connected until said astable multivibrator produces said second signal.

2. A device as in claim 1 wherein said lamps include a first number for indicating a turn in one direction and a second number for indicating a turn in the other direction and including switch means having a first condition preventing lamps in said first number from being connected to said supply and a second condition preventing lamps in said second number from being connected to said supply.

References Cited

UNITED STATES PATENTS 3,197,655 7/1965 Wiseman _____ 307—227
3,244,892 4/1966 Seidler _____ 307—247X
3,313,981 4/1967 Kratochvil _____ 340—82UX THOMAS B. HABECKER, Primary Examiner K. N. LEIMER, Assistant Examiner U.S. Cl. X.R.

307—247, 265, 293; 328—58